United States Patent
Milan et al.

(10) Patent No.: US 6,479,607 B1
(45) Date of Patent: Nov. 12, 2002

(54) TINTED POLYVINYL CHLORIDE COMPOSITION AND A METHOD FOR ITS MANUFACTURE AND USE IN A CABLE

(75) Inventors: Henry Milan, 1709 Apple Ridge Ct., Rochester Hills, MI (US) 48306; Chris Tsai, Taipei (TW)

(73) Assignee: Henry Milan, Rochester Hill, MI (US)

( * ) Notice: Subject to any disclaimer, the term of this patent is extended or adjusted under 35 U.S.C. 154(b) by 0 days.

(21) Appl. No.: 09/709,817

(22) Filed: Nov. 10, 2000

(51) Int. Cl.⁷ .................................................. C08F 20/06
(52) U.S. Cl. .................... 526/317.1; 526/344; 525/165; 525/213; 524/115; 524/127
(58) Field of Search .............................. 526/317.1, 344; 525/165, 213; 524/115, 127

(56) References Cited

U.S. PATENT DOCUMENTS

| | | | | |
|---|---|---|---|---|
| 3,919,137 A | * | 11/1975 | Dyer et al. | 260/17 A |
| 4,912,871 A | * | 4/1990 | Brady | 43/42.26 |
| 5,169,704 A | * | 12/1992 | Faust et al. | 428/143 |

* cited by examiner

*Primary Examiner*—David W. Wu
*Assistant Examiner*—William K Cheung
(74) *Attorney, Agent, or Firm*—Marshall & Melhorn, LLC

(57) ABSTRACT

A PVC composition for use in cables, particularly computer cables, exhibits improved flame resistant qualities. In addition, the cable includes an outer insulating jacket of a transparent or translucent PVC material, which exhibits a slightly tinted appearance. The PVC material additionally includes reflective particles which provide an aesthetically appealing appearance of the cable.

18 Claims, No Drawings

TINTED POLYVINYL CHLORIDE COMPOSITION AND A METHOD FOR ITS MANUFACTURE AND USE IN A CABLE

BACKGROUND OF THE INVENTION

1. Field of the Invention

The present invention relates to polyvinyl chloride (PVC) compositions and methods of manufacture and their use in cables, specifically, cables carrying for carrying electric currents, and most specifically, computer cables.

2. Description of the Prior Art

Known electrical cables contain at least one electrically conductive wire and an outer insulator or jacket. Typically for computer cables, there are a plurality of individually insulated conductive wires, which are typically copper and the outer insulation is often a rubber or plastic material, often PVC based. The wires typically correspond to the various "pins" used in a computer connection and are individually held in a connector for easy connection to the appropriate computer or peripheral. The individual wire insulation is often color coded for ease of following the connections through the cable. In addition, in this type of cable, a sheath, at least partially metal, is often disposed around the plurality of wires. The sheath is typically an aluminum/Mylar layer covered by a copper/tin braid. The sheath can serve different purposes, but can be often utilized as a common ground connection, or as a shield against RF (radio frequency) interference. In various applications, other layers, i.e. additional insulators, may be added as necessary.

Computer cables typically provide a monochromatic exterior appearance, often in black, grey or beige. This appearance is typically provided by having an opaque outer insulator about the cable in the desired color. It is also common practice in the field to color coordinate the connectors of the computer cables, to simplify the correct installation of the cables by the end user. When using a transparent or translucent outer insulation, the appearance of the metal sheath will likely also affect the final appearance of the cable.

SUMMARY OF THE INVENTION

The present invention is a translucent PVC material which, when plasticized, exhibits a tinted appearance. In addition, metallic appearing flecks are added to the PVC compound during manufacture, which provide an aesthetically appealing appearance. Additionally, when formed into a cable, particularly a computer cable, the appearance of the cable is affected by both the translucent PVC, and the underneath material, specifically the underlying sheath. Different numbers of conductive wires and different end connectors can be provided with the cable to make the cable of the present invention suitable for a number of different purposes.

Thus, an object of the invention is a composition for a PVC material which, when used in a cable, exhibits an aesthetically pleasing exterior appearance as described above.

A further object of the invention is a method of making a PVC composition, for the making of cables, particularly, computer cables.

An additional object of the present invention, is to produce a computer cable which is aesthetically pleasing and provides improved flame retardant properties over standard PVC compositions.

The PVC cables of the present invention present a color and appearance that is aesthetically pleasing. In particular, the cables of the present invention provide a color base, preferably gold, and also provide a metallic appearing "flecked" or "speckled" appearance, preferably reflective gold tinted flecks. Additionally, the gold colored PVC can have improved flame retardant properties over standard cables.

DETAILED DESCRIPTION OF THE PREFERRED EMBODIMENT

A preferred composition for the PVC outer coating or jacket of the according to the present invention includes the following materials. The preferred embodiment is based on, first, a basic thermoplastic widely used for cable insulation and jackets. A preferred starting material would be Formosa Plastics "S-70" which is a PVC base material. This PVC base material is especially suitable for use in the present invention. This PVC base material is used in conjunction with a plasticizer, such as "R-65" by the Juyee company. This plasticizer, based on triaryl phosphate, is commonly used in transparent and flame retardant cables.

In addition to the above components, an additional plasticizer, in particular DIDP, by Coin Chemical Ind. is also added. DIDP comprises isodecanol and phthalic anhydride and provides good electric insulation (resistance) and high temperature resistance. This product is widely used in high temperature cabling. As an alternative to the DIDP, DINP, a non-toxic composition of isodecanol and phthalic acid anhydride can be substituted. An oil product, preferably an epoxidized soybean oil product D-81 (Epoxy D-81), by the Juyee Co. can increase the heat retardant properties of the final PVC, and in addition, can provide a desirable color adjustment in the final PVC product. Clear PVC materials tend to not have good fire retardant properties. The color adjustment of the present invention, not only yields an aesthetically appealing gold/yellow tinted appearance, but additionally provides an improved fire resistance.

Stabilizers are also added to the mixture to produce the final PVC product. Preferred stabilizers are: JU-2114, by the Juyee Co., which is a liquid PVC stabilizer based on barium, cadmium and zinc, which positively affects the heating characteristics and has good transparency; E-190 by the Juyee Co. which is a component suitable for clear jackets and serves as a heat stabilizer, comprising a liquid high molecular weight fatty acid ester; and LC-541, also by the Juyee Co., which is also a liquid stabilizer based on cadmium, barium and zinc, which is suitable for bare copper products. In the most preferred embodiment of the present invention, all of the stabilizers are used in making the PVC product. As an alternative to the LC-541, an example of an acceptable alternative would be SU-965D. SU-965D is a stabilizer based upon Di-N-Butyl tin mercaptide.

The E-190 stabilizer can be especially beneficial in that it has a very low volatility, therefore it is a material which does not vaporize easily in the air, or especially under heat. Therefore, during the production of the PVC material it will tend to not vaporize and the heat will instead be absorbed by the PVC. Thus this compound is especially stable during the production process.

An anti-rusting (anti-oxidation) agent is also preferably used in the PVC mixture. A preferred agent is B.T. Anti-Rust agent again by the Juyee Co. This component comprises about 99% Benzotriazole coating to prevent oxidation and rust.

Finally, an additional material is added to provide the speckled appearance. In the preferred embodiment, where a gold tinted cable with gold flecking is desired, a material such as 509B powder from Red-Sun Chemical, of Osaka Japan, is preferred. This material is a foil-like reflective material which will be reflective through the tinted PVC it is to be immersed in. This material is a PET plastic material which is high temperature retardant (240 degrees C) non-toxic and resistant to acid and alkaline environments. This material provides an aesthetically pleasing appearance, and is well suited to formation of cables according to the present invention. When in the PVC, this material yields a reflective, or metallic appearing particle yielding a speckled appearance.

In at least one embodiment of the present invention, the cable can have a gold tint. In at least one preferred embodiment of the present invention, the gold tint can be provided by at least one plasticizer used in the composition for the cable.

The above materials, and the products made from the process described herein, comply with the safety standards found in UL 20276, UL 2725 and UL 2919.

It is important to note that powder stabilizers can tend to have better flame retardant properties. Because of the transparency and final appearance of the product desired herein, liquid stabilizers are preferred in the present invention. Thus, the color affecting stabilizers are used to further affect the final appearance of the product.

By weight, the PVC raw materials comprise about 57.9 weight percent PVC powder; about 5.8 weight % R-65 powder; about 32.4 weight % DIDP (or equivalent); about 2.3 weight % D-81; about 0.2 weight % E-190; about 0.2 weight % JU-2114; about 0.7 weight % SU 965D; about 0.1 weight % B.T. anti-rust; and about 0.3 weight % gold powder.

Im an especially preferred embodiment, 50 kg of S-70, 5 kg of R-65; 28 kg of DIDP, 2 kg of D-81, 0.2 kg of E-190, 0.2 kg of JU-2114, 0.5 kg of LC-541, 0.1 kg of B.T. anti-rust and 0.3 kg of 509B powder are combined to produce a PVC composition for use in a computer cable. In the preferred embodiment, tolerance of +/−5% (by weight) of the components is generally acceptable to yield an acceptable PVC product with an acceptable tint and texture. With regard to the 509B powder, varying the amount of the powder will greatly affect the final appearance and so in order to maintain consistency of appearance, minimizing the variance of this component is especially crucial.

While the present invention preferentially uses the above-described 509B powder, other materials which would yield a similar flecked appearance are also acceptable within the scope of the invention. Such materials could be other plastics, or possibly metals exhibiting a similar appearance.

It is also possible, within the scope of the present invention, that different PVC compositions could be used in forming the PVC for the cable. While this material is preferred because of the fire retardant properties and aesthetically appealing appearance, other PVC materials could be used to yield a different tint.

In a particularly preferred embodiment of the present invention, 50 kg of S-70 can be used in conjunction with 5 kg of R-65, 28 kg of DIDP, 2 kg of D-81, 0.2 kg of E-190, 0.2 kg of JU-2114, 0.5 kg of LC-541, 0.1 kg of B.T. anti rust and 0.3 kg of 509B gold powder. Alternatively, 28 kg of DINP can be substituted for the DIDP, and/or 0.5 kg of SU 9650 can be substituted for the LC-541. This combination yields a final product with an especially appealing gold hue with a contrast to the gold speckles from the powder.

In general, and within the scope of the present invention, there is about a 5% tolerance for each of the components, i.e. about +/−5% of each of the components will yield an acceptable result. Broader tolerances may also yield an appropriate product based on the appearance and texture of the product desired. The variance of the concentration of the 509B powder will have the most effect on the final product. Therefore the variation of this component must be minimized to yield a cable of the final appearance desired. Preferably, the concentration of the metallic appearing gold powder will be consistent in various batches of the operation, to maintain a standard appearance of the cables.

It is also possible to develop similar cables with different base colors and also, possibly, with different colored "flecks" in the PVC, depending on the choice of materials used. Such different colored products may also be determined to have aesthetically pleasing characteristics.

Standard processes for the production of PVC cabling are suitable for use with the present invention, with minor adjustments made for the PVC color and the addition of the metallic appearing powder. The timing of the addition of the metallic powder is especially significant to the appearance of the final product.

The PVC resin of the present invention may be made by standard procedures for the production of PVC. In one embodiment of the present invention, the PVC material can be mixed by first combining the anti-rust agent, the stabilizers, ⅔ of the plasticizers, and the PVC in a mixer. The mixer should be set to automatically disengage upon reaching temperature set points.

The mixing machine can then be started at slow speed and the material can be mixed until it reaches a temperature of about 70° C. The machine can then be increased to a high mixing speed and the material can be mixed to a temperature of about 80° C. At this point, the mixing process can be stopped and additional plasticizer can be added. Before proceeding, unmixed PVC around the mixer can be removed. Two thirds of the metallic appearing powder can then be added, and the mixer can be engaged to a temperature of about 100° C. At this point, an additional quantity of the plasticizers (2 kg) can be added, along with the remained of the metallic appearing powder. The PVC can then be mixed at low speed to about 110° C. and then at higher speeds to about 120° C. When this temperature set point is reached, the remaining plasticizer can be added and the material can be mixed to a temperature of about 128° C. After the PVC is allowed to dry or set, the PVC can then be removed from the mixer. In general, the temperatures can have a variance of about +/−2° C. The most critical timing factors of the present invention is the timing of the addition of the metallic appearing powder. The timing of the addition of this material with have the most noticeable effect on the final appearance of the product. While different timing, to produce different final appearances, are possible within the scope of the present invention, the above designed process is considered to be the most aesthetically appealing, and therefore the best mode of production currently contemplated for the PVC resin.

Preferably, the cable formed according to the present invention is formed by extrusion. The typical cable will contain a plurality of individually insulated conductive wires, with the plurality of wires wrapped by a Mylar/aluminum sheath, particularly, a Mylar layer surrounded by a foil like aluminum layer. Then, disposed over the aluminum layer, is a copper/tin braid, as is customary in the field. The braid can be, for example, copper and tin braided together, or copper coated by tin. Typically the braid is tinned copper, crossed by bare copper in the braid. The braid is then jacketed by the extruded PVC including the metallic appearing flecks. The differing materials for the braid will provide different appearances in a cable produced according to the present invention, as the braid will be visible through the PVC jacket. In this cable, the sheath and braid would primarily provide protection against RF (radio frequency) interference. The PVC jacket then provides electrical insulation against the outside environment.

A cable, according to the present invention, can be made by any standard method of forming cable, as long as the PVC of the present invention is included as the outer insulator or jacket of the cable. The improved fire retardant materials of the present invention tend to yield a gold/yellow cast to the cable, which is aesthetically enhanced by reflections from the metallic appearing speckles, and further by reflections from the copper/tin braided sheath.

As discussed above, the PVC jacket or insulation will preferably be formed by extrusion. The extrusion process for forming the cable can be one that is well known in the art. A preferred process would be one that utilizes seven stages. The temperature of the stages could be, sequentially: about 135° C.; about 140° C.; about 150° C.; about 145° C.; about 150° C.; about 162° C.; and about 172° C. In at least one embodiment of the present invention, the temperature would decrease as additional material is added to the extruder. The temperatures for this process would generally have a tolerance of about +/−2° C.

When producing the cable, it is preferable to use de-oxygenating procedures to minimize oxidation of the copper wires and sheath. It is also important to note that the thickness of the PVC jacket will impact the appearance of the final cable, both the color and the speckled look.

It is to be understood that the form of the invention herein shown and described is to be taken as a preferred embodiment only of the same, and that various changes in the size, shape and arrangement of parts, as well as various procedural changes may be made without departing from the spirit of the invention or the scope of the following claims.

What is claimed is:

1. A transparent, flexible polyvinyl chloride composition containing colored reflective particles which yield a speckled appearance, wherein at least one plasticizer provides a gold tint in the PVC product.

2. The PVC composition according to claim 1, wherein said reflective particles are gold colored.

3. The PVC composition according to claim 1, wherein said reflective particles comprise PET.

4. The PVC composition according to claim 1, comprising PVC powder, at least one stabilizer, at least one plasticizer, and at least one anti-oxidation agent.

5. The PVC composition according to claim 4, comprising benzotriazole.

6. The PVC composition according to claim 4, wherein the at least one plasticizer includes a liquid epoxidized soybean oil.

7. The PVC composition according to claim 4, wherein the at least one plasticizer comprises:

a triaryl-phosphate based plasticizer;

an isodecanol and phthalic acid anhydride based plasticizer; and a liquid epoxidized soybean oil.

8. The PVC composition according to claim 4, wherein the at least one stabilizer comprises:

a liquid stabilizer comprising barium, cadmium and zinc; and one of: a stabilizer based on liquid high molecular weight fatty esters, and a stabilizer based on Di-N-Butyl tin Mercaptide.

9. A translucent, flexible polyvinyl chloride composition containing colored reflective particles which yield a speckled appearance, wherein at least one plasticizer provides a gold tint in the PVC product.

10. The PVC composition according to claim 9, wherein said reflective particles are gold colored.

11. The PVC composition according to claim 9, wherein said reflective particles comprise PET.

12. The PVC composition according to claim 9, comprising PVC powder, at least one stabilizer, at least one plasticizer, and at least one anti-oxidation agent.

13. The PVC composition according to claim 12, wherein the at least one plasticizer includes a liquid epoxidized soybean oil.

14. The PVC composition according to claim 12, wherein the at least one plasticizer comprises:

a triaryl-phosphate based plasticizer;

an isodecanol and phthalic acid anhydride based plasticizer; and a liquid epoxidized soybean oil.

15. The PVC composition according to claim 12, wherein the at least one stabilizer comprises:

a liquid stabilizer comprising barium, cadmium and zinc; and one of: a stabilizer based on liquid high molecular weight fatty esters, and a stabilizer based on Di-N-Butyl tin Mercaptide.

16. The PVC composition according to claim 12, comprising benzotriazole.

17. The PVC composition according to claim 11, wherein said PET particles comprise a temperature resistant non-toxic PET material which is resistant to acidic and basic environments.

18. The PVC composition according to claim 3 wherein said PET particles comprise a temperature resistant non-toxic PET material which is resistant to acidic and basic environments.

* * * * *